Aug. 18, 1959  F. PEKAREK  2,899,704
APPARATUS FOR PRODUCING FIBER REINFORCED SPONGE SHEETING
Filed March 14, 1957

INVENTOR
FRANK PEKAREK
BY
ATTORNEY

United States Patent Office 2,899,704
Patented Aug. 18, 1959

2,899,704

APPARATUS FOR PRODUCING FIBER REINFORCED SPONGE SHEETING

Frank Pekarek, Cleveland, Ohio, assignor to Nylonge Corporation, Cleveland, Ohio, a corporation of Ohio Application March 14, 1957, Serial No. 646,066

5 Claims. (Cl. 18—1)

The present invention relates generally to an improved apparatus for the production of fiber reinforced material, and it relates more particularly to an improved apparatus for the production of fiber reinforced sponge cloth or sheet.

In accordance with the use of conventional means for producing regenerated cellulose sponge by the viscose method, a sponge forming mass consisting of a mixture of viscose, reinforcing fibers and a water soluble pore forming substance such as sodium sulfate decahydrate is placed in a large rectangular mold and the cellulose regenerated by acid or heat treatment. The pore forming material is then removed and the resulting sponge block is washed, bleached, finished, dried and otherwise treated and cut into any desired shapes.

It has been proposed to produce regenerated cellulose sponge sheeting or cloth by continuously extruding a viscose sponge forming mass as a thin sheet of approximately the desired thickness of the end product and coagulating the extruded sheet as such and regenerating the cellulose therein. The sheet may then be after treated, finished and dried continuously in the conventional manner. While this method of producing regenerated cellulose sponge cloth is highly efficient, the finished sponge cloth possesses the highly undesirable characteristic of being weak and having a low tensile strength in a direction transverse to the direction of extrusion of the viscose sponge forming mass, although its tensile strength parallel to the direction of extrusion is high.

It is thus a principal object of the present invention to provide an improved apparatus for the production of fiber reinforced sheet material.

Still another object of the present invention is to provide an improved apparatus for the production of fiber reinforced sponge cloth or sheet.

A further object of the present invention is to provide an improved apparatus for the production of fiber reinforced regenerated cellulose sponge sheeting or cloth.

Still a further object of the present invention is to provide an improved apparatus for the production of fiber reinforced regenerated cellulose sponge sheeting or cloth characterized by a uniformly high tensile strength in all directions.

Another object of the present invention is to provide an improved apparatus for the extrusion of fiber reinforced sponge sheeting or cloth which apparatus is simple, rugged and inexpensive.

Figure 1:
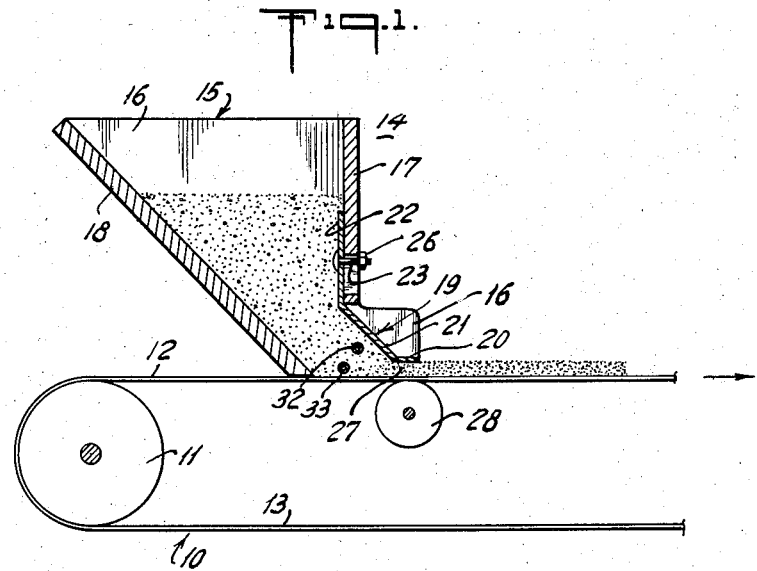
Figure 2:
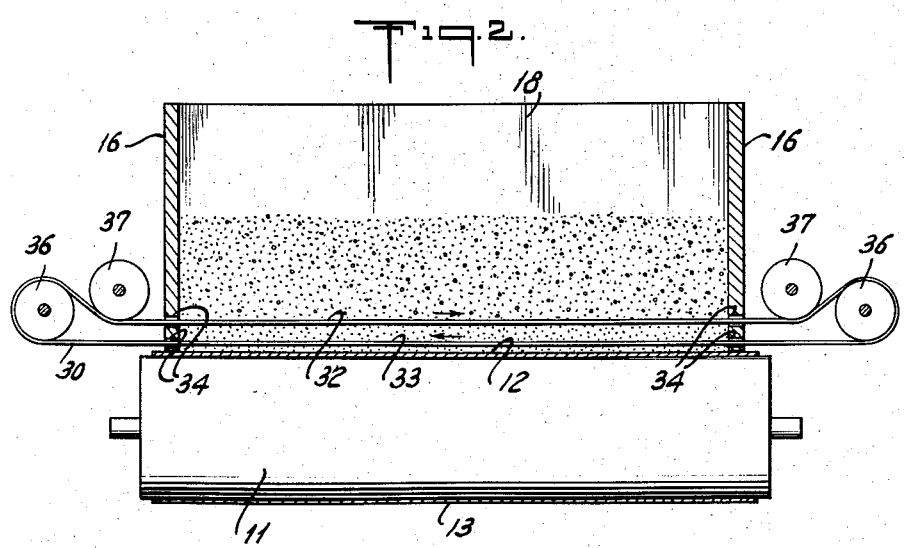

The above and other objects of the present invention will become apparent from a reading of the following description, taken in conjunction with the accompanying drawing, wherein Figure 1 is a front longitudinal sectional view of an apparatus embodying the present invention; and Figure 2 is a transverse sectional view thereof.

In a broad sense, the present invention contemplates the provision of an improved apparatus for the production of fiber reinforced sheeting comprising an extrusion device having an elongated extrusion opening, means for advancing a fiber containing fluid mass through said extrusion opening and means disposed in said fluid mass posterior to said extrusion opening and effecting the orientation of said fiber in said fluid mass in a direction at an angle to the direction of advance thereof.

In accordance with a preferred form of the present apparatus a hopper is disposed above the surface of an advancing endless belt, the hopper having an elongated extrusion opening extending transverse to the conveyor belt and facing in the direction of advance thereof. Located in the hopper posterior to the extrusion opening are the forward and return runs of an endless orienting belt in the form of a wire cable which extends parallel to the extrusion opening and is continuously run at a speed which will impart an orientation to the fibers contained in the extruded mass. Thus, as the mass emerges through the extrusion slit the fibers contained therein are not oriented in a common direction.

Referring now to the drawing which illustrates a preferred embodiment of the present invention, the numeral 10 designates an endless conveyor belt supported and driven by two or more suitably supported and rotated drums 11. The conveyor belt 10 has an upper horizontal advancing run 12 and a lower return run 13. The belt 10 may be formed of any suitable chemical resistant material such as rubber, neoprene, stainless steel, nylon cloth or the like and may be suitably embossed on its outer surface to impart a corresponding impression on the under surface of the sponge cloth produced with the present apparatus.

The conveyor 10 advances along its upper run 12 from a feed end to a discharge end and there is disposed directly above the upper run 12 of the belt 10 adjacent the feed end thereof an extrusion device 14. The extrusion device 14 includes a hopper 15 having side walls 16 and front wall 17 terminating at a point above the upper surface of the belt forward run 12 and a rearwardly upwardly inclined rear wall 18 extending substantially to the top face of the belt 10 at a point rearward of the plane of the front wall 17. An extrusion lip 19 is disposed below the lower end of the hopper front wall 17 and is preferably formed of stainless steel and includes a horizontal lip 20 having an upwardly rearwardly inclined wall 21 which terminates in an upwardly directed vertical flange 22.

A plurality of transversely spaced forwardly directed studs 23 are located along the flange 22 and engage corresponding vertical slots 24 formed in the hopper front wall 17. Each of the studs 23 is engaged by a suitable washer and nut 26 to permit the vertical adjustment of the lip member 19 and the variation of the extrusion opening 27 defined by the confronting faces of the lip 20 and the top run of the belt 10. A freely rotatable transversely extending roller 28 supports the upper run 12 of the belt 10 directly below the lip 20, so as to insure an extrusion of uniform thickness. In the alternative, a flat support plate may be substituted for the roller 28, the plate extending from a point slightly forward of drum 11 to a point forward of the extrusion opening 27. The support plate is chamfered at its leading and trailing edges and is preferably smooth faced so as to minimize frictional drag on the supported advancing belt 10 along its run in the vicinity of the extrusion opening.

The fiber orienting mechanism includes an endless belt 30 defined by a steel wire twisted cable which extends along upper and lower horizontal parallel runs 32 and 33 respectively disposed below the lip wall 21, the run 33 being directly above the level of the upper run 12 of the conveyor belt 10 and in the plane of the hopper front wall 17, whereas the upper run 32 is located forwardly and above the lower run 33 somewhat below the lip wall 21. The belt 30 passes through upper and lower transversely aligned pairs of openings 34 formed in the hopper side walls 16 and pass around oppositely disposed pulleys 36 at least one of which is positively driven. A pair of idler wheels 37 are located between the pulleys 36 and the hopper side walls 16, their lowest peripheries being at the level of the upper openings 34 so that the upper run 32 of the belt 30 freely passes through the openings 34. The lower periphery of the pulleys 36 are coplanar with the lower openings 34 so as to direct the lower run 33 of the belt 30 through the corresponding lower openings 34.

Considering now the production of regenerated cellulose sponge sheeting with the improved apparatus described above, a viscose sponge forming mass is produced by steeping sheets of cellulose containing between 40 and 50 pounds alpha cellulose, for example, 45 pounds of alpha cellulose in an approximately 18½% sodium hydroxide solution for a time sufficient to convert the cellulose into alkali cellulose. The excess sodium hydroxide solution is then pressed from the resulting alkali cellulose in the conventional manner and the unaged alkali cellulose is admixed with between 15 and 35 pounds of carbon bisulfide, for example, approximately 27 pounds of carbon bisulfide, and the resulting mixture is tumbled in a suitable drum until cellulose xanthate is produced in accordance with the general practice. The resulting cellulose xanthate is dissolved in a weak sodium hydroxide solution in an amount to produce approximately 600 pounds of viscose having an analysis of between 6% and 9% cellulose, for example, 7.6% cellulose, 5% to 7% of total alkalinity, for example, 7% and between 3.3% and 5% total sulfur, for example, 3.5%.

To the 600 pounds of viscose in a green unripened condition is then added from 15 to 30 pounds, for example, 20 pounds of thoroughly opened hemp fibers having an average staple length of approximately ⅜ inch to 1 inch and thorough mixing is effected, preferably by means of a double delta blade mixing machine while maintaining the mass at a temperature not exceeding 15° C. This initial mixing period is approximately 20 minutes. To the resulting mass is added between 1500 and 2500 pounds, for example, 2000 pounds sodium sulfate decahydrate crystals having an average particle size in accordance with desired pore size of the finished device. For example, an average particle size of about 5 millimeters will produce a relatively coarse pore device, whereas an average particle size of about 1 to 2 millimeters will produce a relatively fine pore device. The mixing is continued for approximately 10 minutes while maintaining the temperature at about 15° C. or less. It should be noted that any other suitable methods may be employed for producing viscose having the desired properties. An example of such a method is the so-called one-step method which is set forth in the literature.

The viscose sponge forming mass is then deposited in the hopper 15 and maintained at a head above the top surface of the conveyor belt 10 of about 2½ feet. The lip member 19 is adjusted so that the extrusion opening 27 is between ⅛ and ½ inch, for example, 3/16 inch and the wire belt 30 driven between 100 and 150 inches per minute, for example, 120 inches per minute, the belt 30 being of the order of ½ inch behind the extrusion opening 27. The conveyor belt 10 is advanced at speeds between 3 and 60 inches per minute, for example, 10 inches per minute. It should be noted that the optimum speed of the belt 30 depends on various parameters including the speed of the conveyor, the structure of the belt 30, its location and the properties of the sponge forming mass. However, the optimum speeds may be determined during the operation of the apparatus.

The viscose forming mass as it emerges from the extrusion opening 27 and is transported by the belt 10 is thus approximately 3/16 of an inch and the fibers therein assume a substantially random orientation. While advanced by the belt 10 the viscose sponge forming mass is coagulated by means of heat supplied thereto by infrared lamps or, if desired, by passing an alternating electric current through the sheet to raise the temperature or by dielectric heating and coagulating by means of a high frequency electric field. The viscose sponge forming sheet may also be coagulated and regenerated by means of steam, acid solution, hot sodium sulfate solution, heated air or a combination of these.

Following the coagulating of the sheet it is washed with hot water. The resulting cloth is then bleached in the usual manner, washed with acid and treated with a plasticizing solution such as glycerin, polyethylene, glycol, urea or mixtures of same and also preferably including a fungicide and germicide. It should be noted that colored sponges may be formed by mixing a suitable dye with the viscose and that other additives may be introduced into the viscose such as surface active agents, etc. The sponge sheet may then be dried and cut to the desired sizes and shapes. As an alternative, the coagulated sheet may be cut and thereafter treated in the above manner. The width of the conveyor belt 10 may be any convenient width, for example, between 12 and 60 inches wide.

Sponge cloth produced with the apparatus described above and employing the process set forth exhibited a tensile strength which varied little with the direction of measurement and was within the range of approximately 25 to 30 pounds. This is in contrast to sponge sheeting produced in the conventional manner in the absence of the fiber orienting belt 30 which had a tensile strength of 40 pounds in the direction of extrusion of the sheeting and of approximately 5 pounds in a direction perpendicular to the direction of extrusion. It is thus apparent that there has been provided an improved method and apparatus for producing sponge cloth wherein the tensile strength of the cloth is substantially constant and varies very little with the direction of application of the tension.

While there has been described and illustrated a preferred embodiment of the present invention, it is apparent that numerous alterations and omissions may be made without departing from the spirit thereof. For example, coarse meshed cloth may be located within the sponge sheet and may be introduced therein concurrently with the extrusion of the sponge forming mass. Furthermore, the belt 30 may be in the form of a band or helix and may be of any suitable corrosion resistant material. However, it should be noted that the belt 30 should have a relatively rough or non-uniform outer surface to impart a drag to the surrounding fluid sponge forming mass. In addition, while the belt 30 has been illustrated and described as having two runs extending through the sponge forming mass only one of the runs may be so located, or more than two runs of the belt 30 may pass through the mass and be variously located therein. The plurality of runs may be provided by one or more endless belts driven at the same or different speeds.

I claim:

1. An improved apparatus for the production of fiber reinforced sponge sheeting comprising an endless driven first belt having an upper run advancing longitudinally from a feed end to a discharge end and provided with a top face, a hopper disposed above said endless belt top face adjacent to said feed end and having a downwardly directed bottom opening immediately above and directed downwardly to said first belt top face, said hopper having a transversely extending front opening formed in the lower portion thereof extending to said first belt top face and facing said belt discharge end and a transversely extending driven endless second belt disposed in said hopper above said first belt and in alignment with said front opening.

2. An improved apparatus for the production of fiber reinforced sponge sheeting comprising an endless driven first belt having an upper run advancing longitudinally from a feed end to a discharge end and provided with a top face, a hopper disposed above said endless belt top face adjacent to said feed end and having a downwardly directed bottom opening immediately above and directed downwardly to said first belt top face and a front wall having a lower edge disposed above said first belt top face, a forwardly downwardly inclined wall projecting from said front wall lower edge and terminating in a forwardly directed lip spaced above said first belt top face, and a transversely extending driven endless second belt located in said hopper between said inclined wall and said first belt top face and posterior to said lip.

3. An improved apparatus in accordance with claim 2 including means for adjusting the spacing between said lip and said first belt top face.

4. An improved apparatus in accordance with claim 2 wherein said transversely extending second belt comprises a twisted wire cable.

5. An improved apparatus in accordance with claim 2 wherein said transversely extending driven endless second belt includes longitudinally offset upper and lower runs.

References Cited in the file of this patent
UNITED STATES PATENTS

| | | |
|---|---|---|
| 2,380,363 | Land et al. | July 10, 1945 |
| 2,620,511 | Marshall et al. | Dec. 9, 1952 |
| 2,671,743 | Lindquist | Mar. 9, 1954 |
| 2,676,356 | Becker | Apr. 27, 1954 |
| 2,697,254 | Gordon | Dec. 21, 1954 |